(12) United States Patent
Yoon et al.

(10) Patent No.: US 8,473,447 B2
(45) Date of Patent: Jun. 25, 2013

(54) AI PLANNING BASED QUASI-MONTECARLO SIMULATION METHOD FOR PROBABILISTIC PLANNING

(75) Inventors: Sungwook Yoon, Palo Alto, CA (US); Wheeler Ruml, Durham, NH (US); Minh Binh Do, Mountain View, CA (US); J. Daniel Benton, Tempe, AZ (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 416 days.

(21) Appl. No.: 12/748,686

(22) Filed: Mar. 29, 2010

(65) Prior Publication Data
US 2011/0238614 A1 Sep. 29, 2011

(51) Int. Cl.
*G06F 9/44* (2006.01)
*G06N 7/02* (2006.01)
*G06N 7/06* (2006.01)
*G06F 19/00* (2011.01)
*G06F 17/18* (2006.01)
*G06Q 10/00* (2012.01)

(52) U.S. Cl.
USPC .............. 706/52; 700/93; 702/181; 705/7.11; 705/7.36; 705/7.37

(58) Field of Classification Search
USPC .............. 706/52; 700/93; 702/181; 705/7.11, 705/7.36, 7.37
See application file for complete search history.

(56) References Cited

U.S. PATENT DOCUMENTS

| 5,341,292 | A | 8/1994 | Zamenhof | |
|---|---|---|---|---|
| 6,745,384 | B1 | 6/2004 | Biggerstaff | |
| 6,947,904 | B1 | 9/2005 | Macey | |
| 7,412,414 | B2 * | 8/2008 | Michaud et al. | 705/36 R |
| 2002/0169658 | A1 * | 11/2002 | Adler | 705/10 |
| 2004/0015381 | A1 * | 1/2004 | Johnson et al. | 705/8 |
| 2005/0027645 | A1 * | 2/2005 | Lui et al. | 705/38 |
| 2005/0050122 | A1 * | 3/2005 | Blumenthal et al. | 708/250 |
| 2005/0097224 | A1 * | 5/2005 | Chen et al. | 709/246 |
| 2007/0011107 | A1 * | 1/2007 | Benson et al. | 706/1 |
| 2007/0022057 | A1 * | 1/2007 | Benson et al. | 705/59 |
| 2007/0136118 | A1 | 6/2007 | Gerlach | |
| 2007/0288138 | A1 | 12/2007 | Bodin | |
| 2009/0210378 | A1 * | 8/2009 | Benson et al. | 706/52 |
| 2011/0125702 | A1 * | 5/2011 | Gorur Narayana Srinivasa et al. | 706/52 |
| 2011/0270646 | A1 * | 11/2011 | Prasanna et al. | 705/7.27 |

\* cited by examiner

*Primary Examiner* — Jeffrey A Gaffin
*Assistant Examiner* — James F Sugent
(74) *Attorney, Agent, or Firm* — Fay Sharpe LLP

(57) ABSTRACT

A computer-based method and system for AI planning based quasi-Monte Carlo simulation for probabilistic planning are provided. The method includes generating a set of possible actions for an initial state, generating a set of sample future outcomes, generating solutions for each of the sample future outcomes, using an AI planner, generating a set of future outcome solutions that are low probability and high-impact, combining the solutions generated from each of the sample future outcomes with the future outcome solutions generated by the AI Planner into an aggregated set of future outcome solutions, analyzing the aggregated set of future outcome solutions, selecting a best action based at least partially on the analysis of the aggregated set of future outcome solutions, and outputting the selected best action to computer memory.

23 Claims, 7 Drawing Sheets

AI PLANNING BASED QUASI-MONTECARLO SIMULATION METHOD FOR PROBABILISTIC PLANNING

BACKGROUND

The present exemplary embodiments relate to a system and method for Artificial Intelligence (AI) planning based quasi-Monte Carlo simulation for probabilistic planning. As observed in the financial markets and other uncertain environments, it is difficult to make rational decisions when the future is unknown. Although there are many ways to create models based on an environment containing an uncertain future, the models need to be solved correctly and completely in order to make optimal decisions with respect to the environment such that losses are prevented or mitigated and gains are maximized. However, the problem of finding optimal solutions within an uncertain environment is normally intractable and at best only approximates solutions with great computation complexity. Thus, the goal is to find an approach that balances between computational complexity and a good quality solution.

BRIEF DESCRIPTION

A computer-implemented system and method for AI planning based quasi-Monte Carlo simulation for probabilistic planning is provided. The system and method includes receiving an initial state and a description of a target domain into computer memory; generating a set of possible actions that can be executed for the initial state; for each action in the set of the possible actions: generating a set of sample future outcomes; generating solutions for each of the sample future outcomes; using an AI planner, generating a set of future outcome solutions having a low probability but having a high impact; combining the automated AI planner produced solutions generated from each of the sample future outcomes; and analyzing the aggregated set of future outcome solutions; selecting a best action based at least partially on the analysis of the aggregated set of future outcome solutions; and outputting the selected best action to computer memory.

DETAILED DESCRIPTION

Aspects of the present exemplary embodiment relate to a system and method for decision making with regard to uncertain future problems using sampling. Specifically, the exemplary embodiment samples possible future outcomes based on the known probabilities of future events and then solves deterministic problems represented by the sampled future outcomes. The exemplary embodiment utilizes the fact that deterministic versions of the intractable problem are much easier to solve. The solutions from many of the deterministic problems are then combined, which allows for accurate decision making when the sampled future outcome set is representative of the problem.

Figure 1:
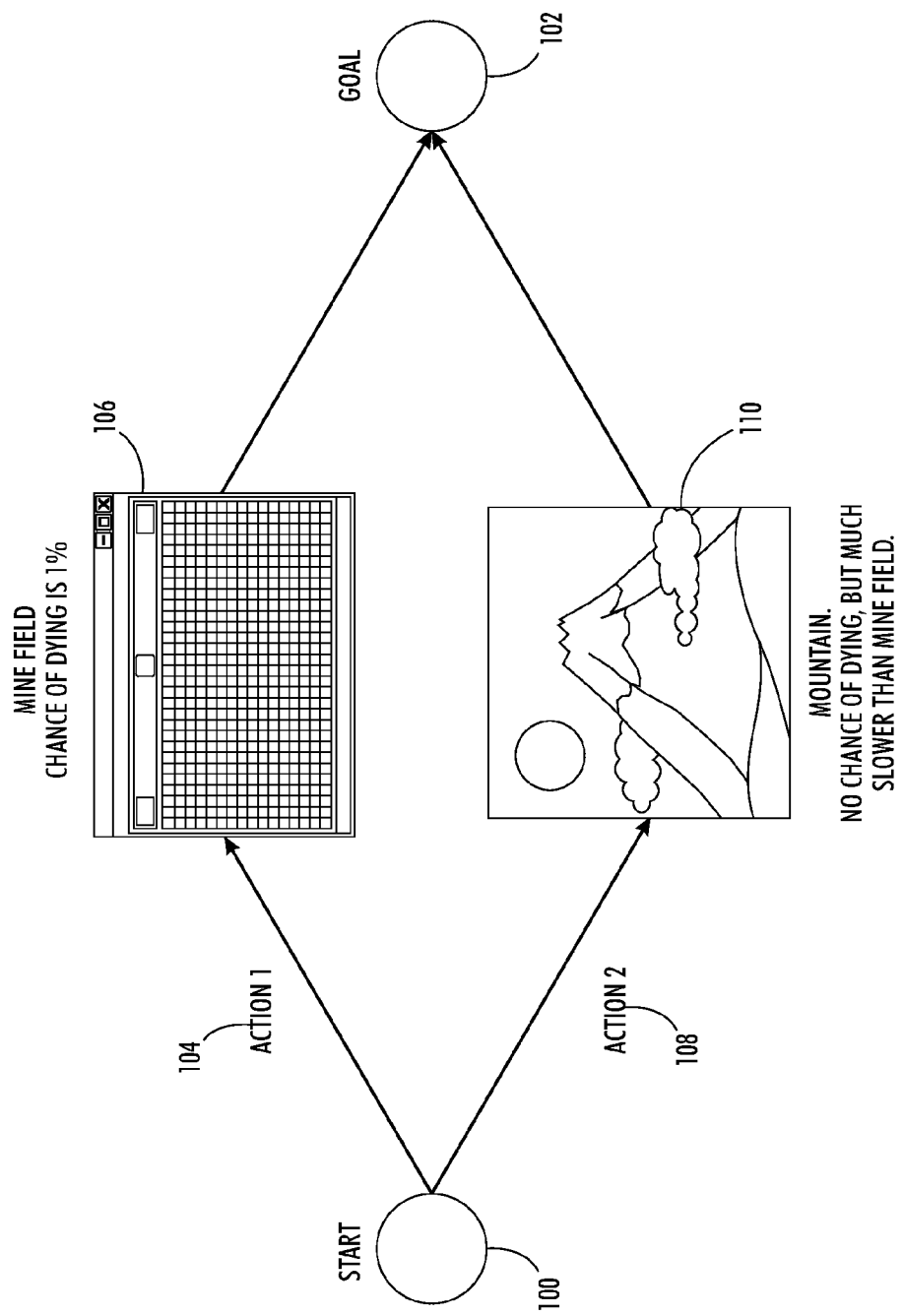
FIG. 1 illustrates a simple example of probabilistic planning, where an actor has to choose between two actions to reach a goal state.

With reference to FIG. 1, an example probabilistic planning problem is illustrated. The probabilistic planning problem starts at point 100, with the goal of arriving at point 102 in as short a time as possible, without dying. A person at point 100 wanting to arrive at point 102 will have one of two choices. First, the person may choose a first action 104 that will enable the person to arrive at goal point 102 in a quick fashion, but this comes with the remote possibility that the person will die in a mine field 106. The alternative is to choose a second action 108 that will take the person across a mountain range 110 and guarantees a safe arrival at goal point 102. However, the path of the second action 108 is also guaranteed to take much longer than the path of the first action 104 through the mine field 106. Thus, the probabilistic planning problem attempts to solve the dilemma of whether to choose the faster first action 104 over the much slower second action 108 in view of the very unlikely, yet very serious, consequence of dying.

Previous approaches to planning and scheduling in uncertain environments have traditionally been formulated as Markov Decision Processes (MDP) and solved by finding the optimal policy over many iterations of a Bellman update. In practice, it turns out that naïve application of MDP is not conducive to real-world applications due to poor running time and performance.

Other approaches to decision making with regard to an uncertain future, such as the Monte Carlo approach, sample the futures based on the probability that each future event may occur but do not take into account the "importance" or "significance" of different future events. Thus, this type of approach often omits high-impact future outcomes from the set of sample futures. High-impact future outcomes are outcomes that, regardless of their probability of happening, would have a significant impact (whether positive or negative) on the solution for a deterministic problem.

The exemplary embodiments of the present application incorporate very unlikely but critical/high-impact future outcomes, such as financial defaults in banking or landmine explosions, when generating sample futures. Rather than naively sampling from some distribution, the exemplary embodiment utilizes AI (artificial intelligence) planning to automatically find unlikely but critical sequences of events. The described systems and methods can be viewed as a quasi-Monte Carlo approach, since rather than sampling based on raw probabilities, a particular sample set is found through a known reasoning process such as AI planning as used in this implementation.

Regular Monte Carlo sampling works by simulating multiple "what-if" scenarios and combining the "what-if" simulation results to evaluate various input plans. The quasi-Monte Carlo approach works like the regular Monte Carlo approach, where a different set of "what-if" scenarios are chosen to simulate. The present exemplary Monte Carlo simulation embodiment performs computed sampling like quasi-Monte Carlo, but the composition of the sampling is done through AI planning. The use of AI planning provides for autonomous or near-autonomous sampling, whereas existing quasi-Monte Carlo style sampling relies on a human interaction. Through the combination of AI planning based quasi-Monte Carlo and normal Monte Carlo sampling, significant computational gains are achieved with increased autonomy.

As shown in standard probabilistic planning benchmarks, AI (i.e., deterministic) planning can be used very effectively in uncertain environments by considering all the probabilistic outcomes as separate deterministic outcomes while finding solutions for extreme cases. Preliminary results show that this approach can capture unlikely but critical uncertain outcomes and the whole decision making can be made much better and more stable.

The exemplary embodiments describe an approach of effective decision making in the presence of uncertainty by using an "anticipatory" technique. This technique is applicable to a broad area of decision making, scheduling and planning in uncertain situations. These situations happen naturally in many environments and situations. For example, in warfare situations, an Army moving into enemy area may have no clear idea of where the enemy is hiding and will want to maximize its chance of finding the enemy with some sort of planning technique. In the financial sector, banks routinely make decisions on whether to lend money based on a borrower's past credit, but the process of decision making is uncertain, since banks do not know what will happen in the future. On a larger scale, financial crises may be averted if optimal or near-optimal decisions can be made by the parties involved in the market. In an environment such as a production system, this technique is useful as better decisions can be made as to what actions to take relative to unknown future costs.

Probabilistic planning, scheduling and decision making algorithms have been developed to cope with uncertain futures such as those scenarios described above, and the present exemplary embodiment improves the performance of those techniques. There are many ways to model the uncertain nature of the environment and if the models are solved correctly and completely, optimal decisions can be made. However, the problem of finding optimal solutions is normally intractable and at best only approximates solutions with great computational complexity. Thus, the goal is to find an approach that balances between computational complexity and a good quality solution.

Figure 2:
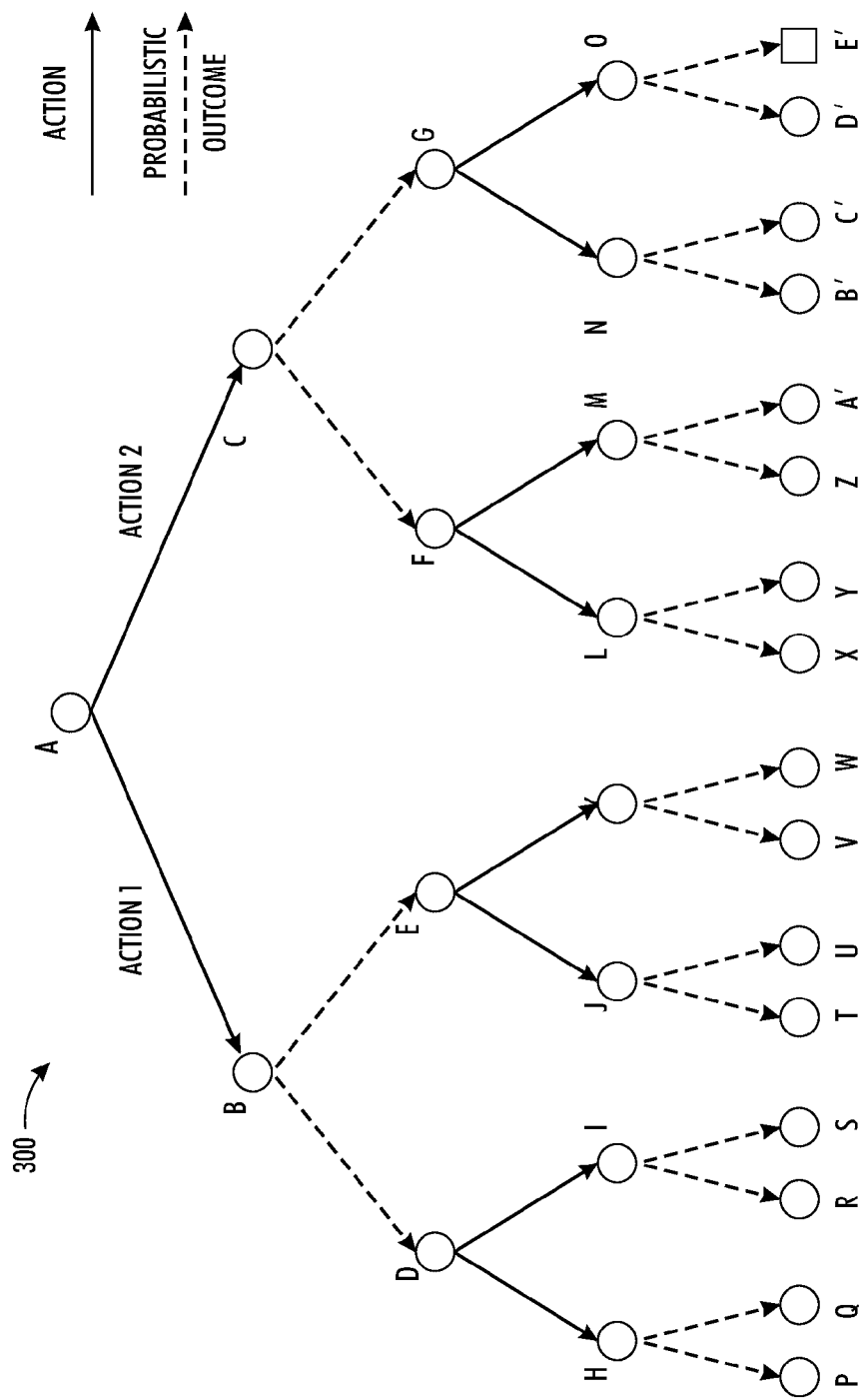
FIG. 2 illustrates a probabilistic planning problem in tree form, where the tree contains actions, future outcomes and solutions.

With regard to FIG. 2, shown is a probabilistic planning tree 300 containing many "what-if" scenarios. The tree illustrates a simple uncertain future scenario beginning at state A. The solid arrows in the tree indicate possible actions taken by an agent, and the perforated arrows indicate the possible outcomes after performing an action. For example, at state A, an actor has one of two choices, Action1 or Action2. Supposing that the actor chooses Action2, the process will move to intermediate state C, where one of two possible outcome states will exist (state F or state G). The likelihood of the actor arriving at state F or state G depends on the relative probability of probabilistic outcome CF and probabilistic outcome CG. Once at either state F or state G, the actor will once again make a decision of which action to take from the current state. Depending on the action taken, along with the relative probabilistic outcomes of the next layer of probabilistic outcomes, the actor will eventually end up at a state between X and E'.

This probabilistic planning tree 300 can be mapped out a-priori based on known probabilities. However, one of the key problems in simulating future "what-if" scenarios is the size of the future sample set when the method simulates far into the future with a long horizon. As one can see in FIG. 2, at every time point of the future, the "what-if" sampling must be repeated and the number of such "what-if" futures can increase at an exponential rate. Fortunately, Monte-Carlo methods, which sample from well-known distributions, are quite robust in terms of the size of dimension. That is, even though Monte Carlo sampling methods envision far-ahead futures, they do not need to sample more as the distance of the future (i.e., horizon) increases.

However, there is one big caveat with Monte Carlo sampling methods: the sampled points need to be well correlated with the bottom-line actual distribution multiplied by the implied risk/reward. This situation can be illustrated by the concept of "default" within the banking industry. Typically, a default (a failure to meet financial obligations) is a rare event. Consequently, this rare event is not usually sampled with normal uniform sampling, such as that used in the Monte Carlo sampling method. Additional sampling algorithms such as stratified or residual sampling algorithms may also fail to sample rare events. However, the cost of such a default, despite being a rare event, is high enough that the sampling method needs to sample such occasion and evaluate it in order to create a viable set of future samples.

Figure 3:
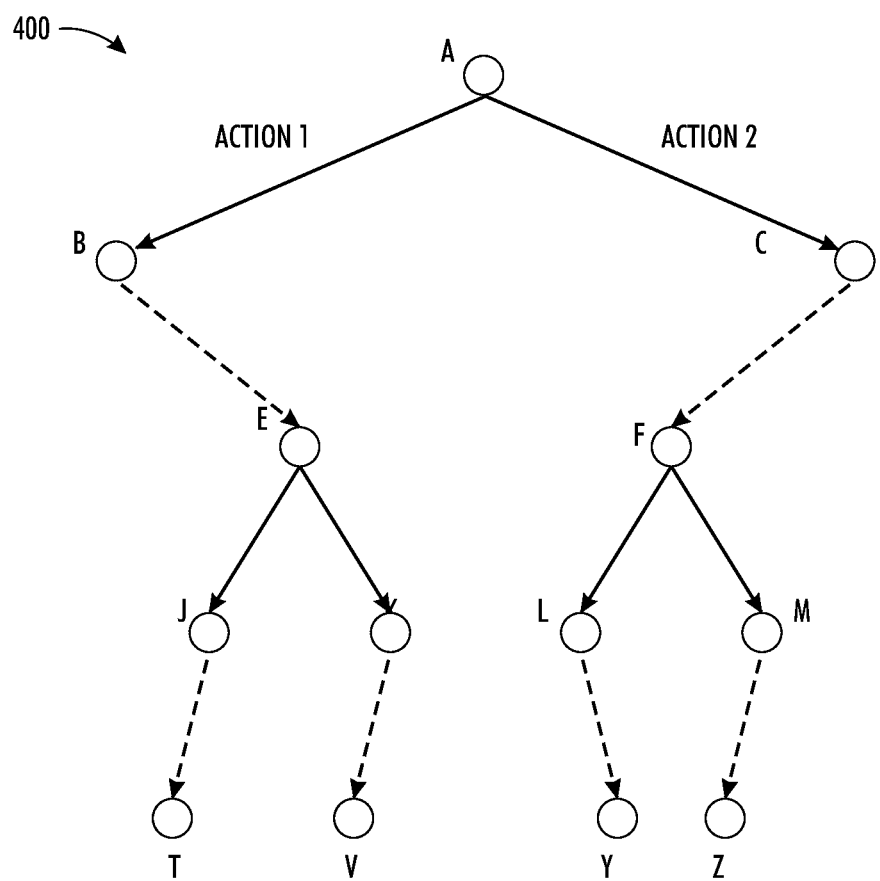
FIG. 3 illustrates the sample probabilistic outcomes considered by a regular Monte Carlo simulation.

With respect to FIG. 3, an example set 400 of future samples derived from the uncertain future of FIG. 2 is illustrated. The example set 400 was derived by using a Monte Carlo uniform sampling algorithm. The sampled futures in FIG. 3 are states E, F, T, V, Y and Z. This set of sample futures may work well with an uncertain future containing no high-impact future outcomes, but will not work well with an uncertain future such as the future illustrated in FIG. 2. In the probabilistic planning tree of FIG. 2, outcome E' is a low probability, but high-impact outcome that should be accounted for when creating a model for optimal decision making in an environment containing an uncertain future. The present concepts provide a system and process to reliably include low-probability, high-impact future outcomes (i.e., rare events) when creating a future sample set for use in a Monte Carlo simulation.

One way to do this rare-event simulation is by modifying the sampling function to be able to sample unlikely samples associated with high risk or reward values more frequently than they could have been and re-adjust the weights to reflect the modified sampling. This method has been known as importance sampling and is widely used in many of the current software packages. One such method of importance sampling is quasi-Monte Carlo simulation. This technique attempts to solve the problem by pre-designing the sampling pattern. So, in fact, it is not actual sampling but rather finding where to sample with meticulously designed Mesh-style points.

The benefit of this technique is potential robustness compared to normal sampling, which is typically very unstable, whereas pre-designed quasi-Monte Carlo points provide robustness and reduced variance. The cost of an approach such as quasi-Monte Carlo sampling is that it is not known a-priori what samples constitute rare/high value occasion. Another cost is having too many sample points that deteriorate the overall efficiency significantly compared to existing Monte Carlo Simulation.

Figure 4:
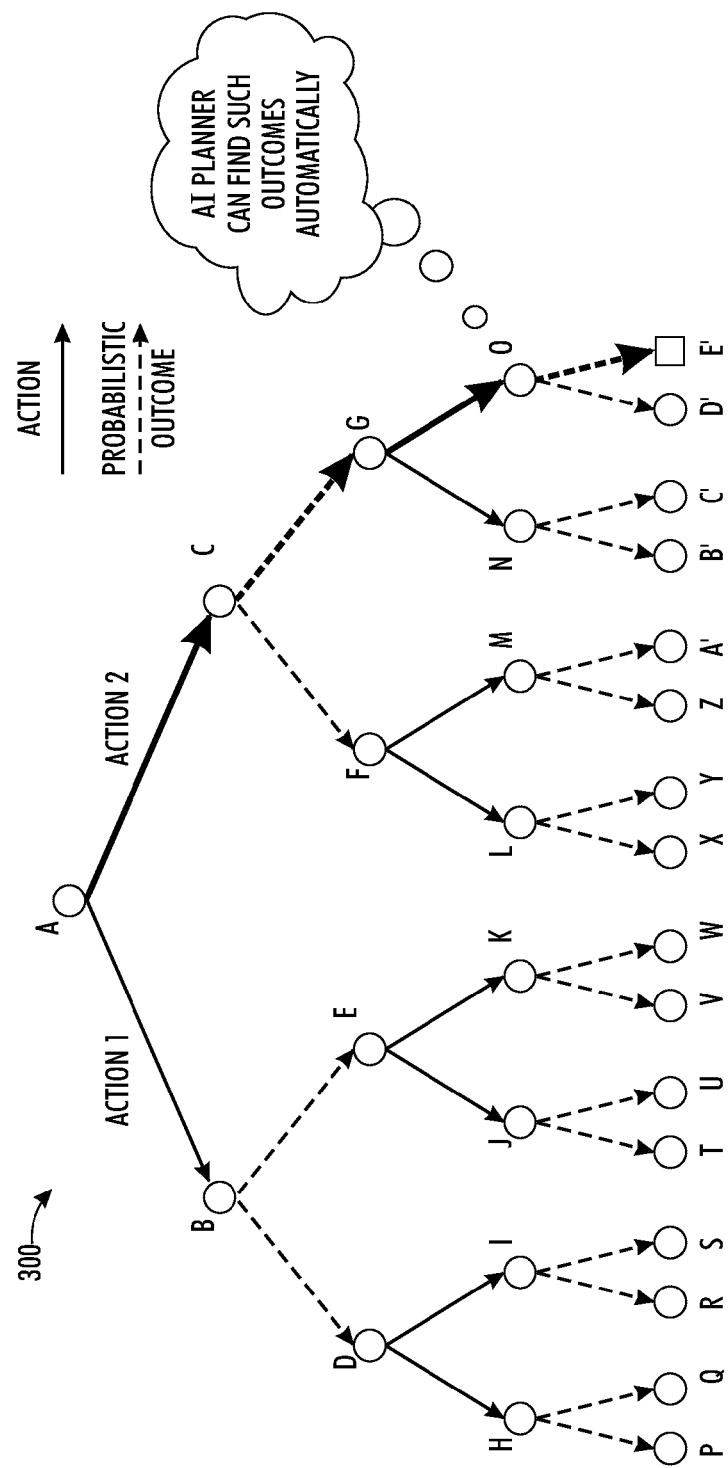
FIG. 4 shows a low probability, high-impact outcome found in the probabilistic planning tree of FIG. 2 by an AI planner.

With respect to FIG. 4, a probabilistic planning tree is shown that highlights a path from initial state A to the high-impact state E' found by an AI Planner. Because rare but critical incidents may have an immense effect on decision making, the present concepts ensure that rare but critical incidents are accounted for in simulation based decision making algorithms. Thus, the present exemplary embodiment uses AI planning techniques to systematically and automatically find unlikely, yet high impact, events in the future (such as E' in FIG. 4) and makes sure that such occasions are counted in simulation in route to the making a final decision.

Figure 5:
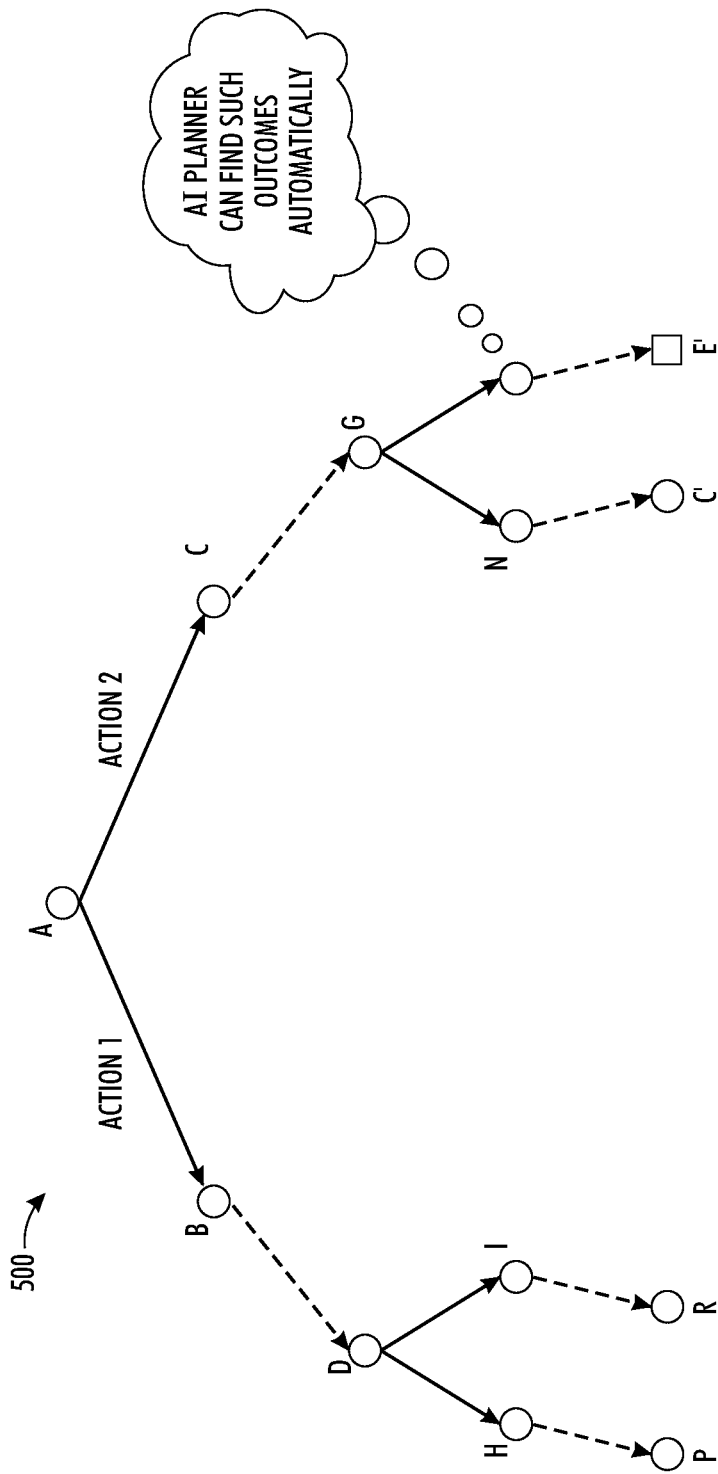
FIG. 5 illustrates the sample probabilistic outcomes considered by the quasi-Monte Carlo simulation of the present exemplary embodiment.

With respect to FIG. 5, an example set 500 of future samples derived from the uncertain future of FIG. 2, including future outcomes identified by an AI Planner is illustrated. As explained above, it is extremely difficult to automatically sample highly unlikely but very critical incident with normal sampling. A-priori designed sampling methods are also unfit to account for random drifting in uncertain environments. Thus, AI planning has been developed to synthesize sequences of actions to achieve multiple goals. The AI planning technique is well suited to find sequences of "rare" events that lead to critical incidents. Accordingly, the AI planner automatically finds "rare" sequences of events that may have a large impact on decision making.

An advantage of using AI planning is the ability to construct causally related action sequences that achieve a desired effect. The present exemplary embodiment utilizes this particular property of AI planning as a sampling source for the quasi-Monte Carlo simulation. Particularly, in place of actions, the modified quasi-Monte Carlo simulation views random outcomes that are handled by simulation as actions in AI planning. Then the whole problem of identifying potentially harmful random sequence events (or outcomes) is cast as a planning problem by putting the outcomes as actions and potentially harmful results as "desired effects" or "goals". This view fits nicely with the problem of making decisions in an uncertain environment.

Figure 6:
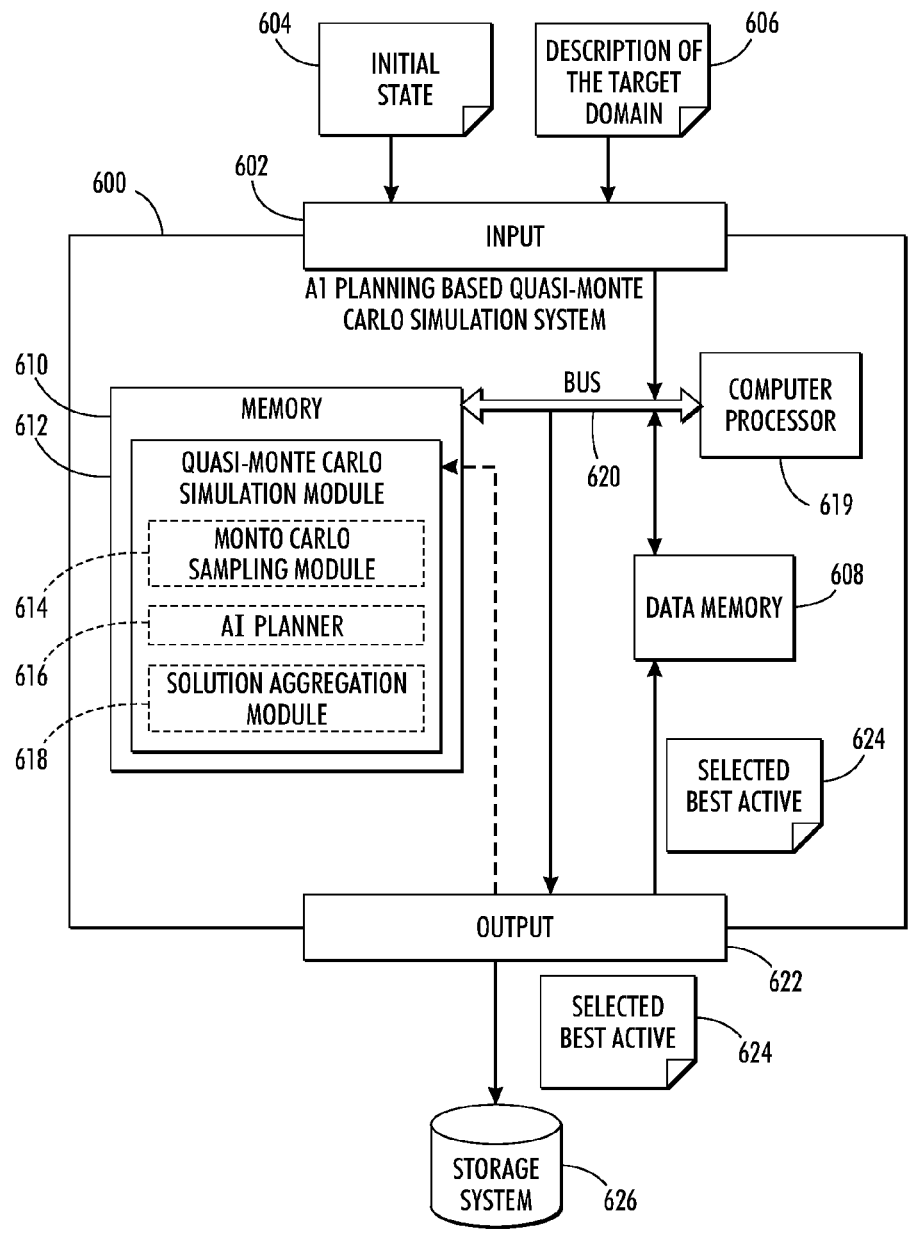
FIG. 6 illustrates the working components of an AI planning based quasi-Monte Carlo simulation system.

With respect to FIG. 6, an exemplary AI Planning based quasi-Monte Carlo simulation system 600 is described. The system 600 includes an input device 602, for receiving an initial state 604 and a description of the target problem domain 606. Prior to inputting, the initial state 604 and the description of the target problem domain 606 may be stored in any suitable tangible media such as a ROM or RAM drive or may be input into the system in the form of a carrier wave, e.g., via the Internet or a LAN. Alternatively, the initial state 604 and description of the target problem domain 606 may be produced within the computing device 600, itself. The input may include a modem link, a wired or wireless connection, USB port, floppy or hard disk receiver, or the like.

The system 600 includes data memory 608 for use during the processing of the initial state 604 and description of the target domain 606. Main memory 610 of the system 600 stores a quasi-Monte Carlo simulation module 612 containing a Monte Carlo sampling module 614, an AI Planner 616, and a solution aggregation module 618. The quasi-Monte Carlo simulation module 612 works in conjunction with modules 614, 616 and 618 to calculate the best action to take at a given state. In particular, the Monte Carlo sampling module 614 is adapted to generate all the possible actions for a given state and generates a set of sample futures for a given starting (initial) state. The futures represent the possible outcomes for each state that are realized if a particular action is selected. For example, FIG. 3 shows one outcome (perforated lines) for each action at each time point (tree level in the figure). These represent "futures" in the present exemplary embodiment. In other words, a future is a deterministic selection of action outcomes for all the time points. The AI Planner 616 independently finds low probability, yet high-impact possible futures and combines these identified futures with the sample futures calculated by the Monte Carlo sampling module 614. The AI Planner 616 can be any planning module known now or in the future that finds unlikely paths that produce a significant outcome. The AI Planner 616 generally receives as input the initial state 604 and a description of the target domain 606. The description of the target domain 606 includes a description of the desired goal (i.e, the properties of a desirable end state solution or high impact states), known probabilities of future events, and a set of possible actions for the initial state 604. The solution aggregation module 618 is adapted to perform a statistical analysis on the set of solutions produced by the Monte Carlo sampling module 614 and AI Planner 616 in order to choose a best action from the given initial state 604.

The quasi-Monte Carlo simulation module 612, Monte Carlo sampling module 614, AI Planner 616 and solution aggregation module 618 may be implemented as hardware or software or a combination thereof. In the exemplary embodiment, components 612, 614 and 616 comprise software instructions stored in main memory 610, which are executed by a computer processor 619. The processor 619, such as a computer's CPU, may control the overall operation of the computer system by execution of processing instructions stored in memory 610. Components 608, 610 and 619 of the computer system 600 may be connected by a data control bus 620.

The system 600 includes an output device 622, which outputs processed data, such as a selected best action 24. The exemplary output device 622 is linked by a wired or wireless link to a storage system 626, which may store a selected best action 624. Alternatively, the output device 622 may store processed data, such as a selected best action 624 into internal memory 608 of the computing device 600.

As will be appreciated, the AI Planning based quasi-Monte Carlo simulation system 600 may comprise one or more computing devices, such as a personal computer, PDA, laptop computer, server computer, or combination thereof. Memories 608 and 610 may be integral or separate and may represent any type of computer readable medium such as random access memory and read only memory. In some embodiments, the processor 619 and memory 608 and/or 610 may be combined in a single chip.

Figure 7:
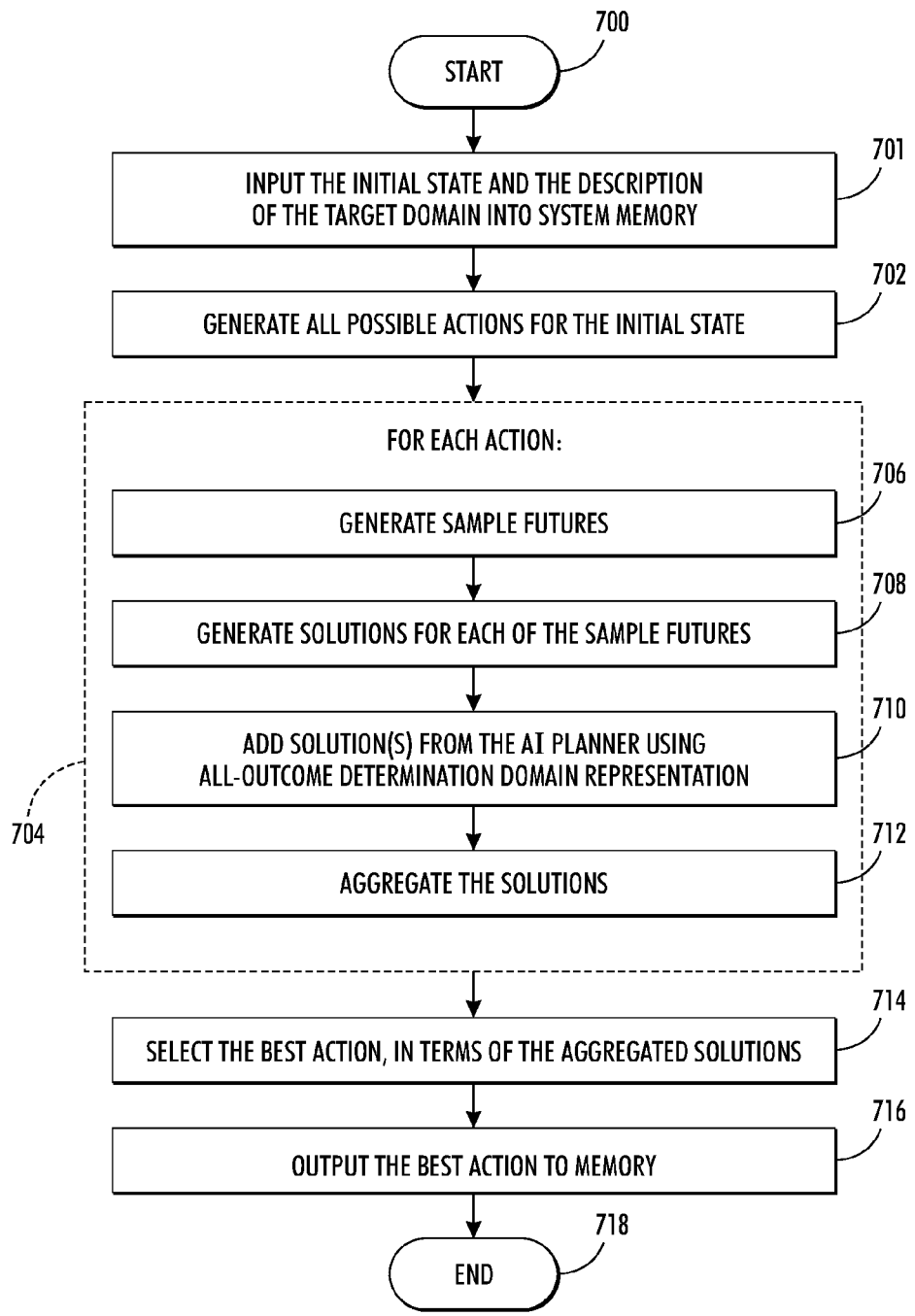
FIG. 7 is a flow diagram illustrating a method for AI planning based quasi-Monte Carlo simulation, adapted to use the system of FIG. 6.

With reference to FIG. 7, an exemplary method for AI planning based quasi-Monte Carlo simulation is described. The method may be performed on the exemplary system detailed in FIG. 6. The method begins at step 700.

At step 701, the input device 602 of the simulation system 600 receives an initial state 604 and a description of the target domain 606 and imports them into data memory 608. The method then proceeds to step 702.

At step 702, all possible actions (such as Action1 and Action 2 of FIG. 4) for the initial state 604 are generated by the Monte Carlo sampling module 614 or its equivalent. For example, if the present exemplary embodiment is simulating a stock exchange transaction, then two actions may be generated. In this case, the first action will be to sell stock of a certain company, and the second action will be to buy stock of the same company. With respect to FIG. 4, the first action is represented by action AB and the second action is represented by action AC. Note that any number of possible actions may be generated in this step, depending on the simulation being performed. In some embodiments, more than two actions will be generated. After this step is performed, control is then passed to the control loop starting at step 704.

At step 704, steps 706, 708, 710 and 712 are performed for each action generated above in step 702. Control is then passed to the solution aggregation module 618 at step 714.

At step 706, the Monte Carlo sampling module 614 generates a set of sample futures according to any sampling algorithm known in the art, including, but not limited to, uniform sampling algorithms traditionally used for Monte Carlo simulation. The number of sample futures generated will be statistically sufficient to enable a near optimal simulation while keeping processing costs low. With respect to the stock exchange transaction example above, the Monte Carlo sampling module 614 may determine with 90% confidence that if the second action is performed, there is a 99% chance of the stock increasing in value by 20%, and a 1% chance of the stock decreasing in value by 80%. With respect to FIG. 4, the first sample future with the stock increasing in value is represented by probabilistic outcome CF and the second sample future with the stock decreasing in value is represented by probabilistic outcome CG. Because of the low probability (1%) of the stock decreasing in value by 80%, the Monte Carlo sampling module is unlikely to use future outcome CG in its set of sample futures. The generated sample futures are then processed at step 708. Generating all the future outcomes for all time points or states and for all possible actions is computationally impossible. To mitigate this computational problem, one aspect of the present exemplary embodiment generates a fixed length sequence of random numbers between 0 and 1. The fixed length serves as practical limit for a time horizon extending into the future. The algorithm does not have look too far, e.g., 1000 years ahead in time, to make an informed decision. The random number for each state is designated as an outcome each action at a given state. For example, if the random number is 0.3 and two outcomes for an action are possible with 0.2 and 0.8 probability each, then the second outcome is selected, given the random number value of 0.3, because this number is greater than 0.2 which is outside the region of first outcome's chance. If for another action the two possible outcomes' probabilities are 0.5 and 0.5, then the first outcome is selected with the random number, because 0.3 is less than 0.5, which is the chance region for the first outcome.

At step 708, solutions are generated for each of the sample futures produced by step 706. That is, for each sample future, the Monte Carlo sampling module 614 determines the state that will exist if the sample future actually materializes. With respect to the stock exchange transaction example, step 706 generated two sample futures (potential outcomes) out of many that could have been sampled in step 706. The resulting outcome for the first sample future where the stock increases in value by 20% is a "selling" of stock that has just increased 20% in value (represented by state F in FIG. 4). Since the highest profit possible is the desired goal, if one believes that the stock will increase in value by 20% in the future, then one will hold that stock. The resulting solution for the second sample future where the stock decreases in value is a selling of stock that has only 20% of the value relative to the initial purchase price (represented by state G in FIG. 4). Again, if one wants to maximize profit, then one will sell or short the stock if the data indicates that the stock will be devalued in the future. By analyzing the two sample futures, one has a better chance of maximizing profit with respect to the stock. Thus, for this stock trading example, the solutions are buying, holding, selling, or shorting the stock of interest. The solutions calculated by the Monte Carlo sampling module 614 are then passed to the solution aggregation module 618 at step 712.

At step 710, the AI Planner 616 generates solutions starting at the initial state 604 using all-outcome determination domain representation. All outcome determination treats each probabilistic outcome of actions as a separate deterministic action. For example, in the stock example presented above, two actions are generated, one that increases the stock and the other that decreases the stock. The AI Planner 616, or its equivalent, uses the determined set of actions (all the possible outcomes) and given the initial state 604 and an input description of a target domain 606, finds any low probability high-impact future outcomes automatically. As described above, the description of the target domain 606 includes a description of the desired goal (i.e, the properties of a desirable end state solution), known probabilities of future events, and a set of possible actions for the initial state 604. The description of the target domain may be encoded in any formal language (such as PDDL—planning domain definition language) suitable to convey such information, such as the languages found in the Stanford Research Institute Problem Solver (STRIPS) domain. The thresholds for whether an outcome is considered low probability and/or high-impact may be set by an outside entity (such as an end user) or may be set as default values. For example, a parameter may be set in the AI Planner to classify an outcome as low probability if the probability is less than 0.5%, or to classify an outcome as high-impact if it results in a state that causes a change from the initial state 604 of at least 500%. With respect to FIG. 4, the AI Planner will automatically find the low probability, high-impact probabilistic outcome E', represented by the path ACGOE'.

The solution aggregation module 618 then combines the low probability, high-impact solutions generated by the AI Planner 616 with the sample solution set generated in step 708. The combined set of sample future solutions are then processed by the solution aggregation module 618 at step 712.

At step 712, the solution aggregation module 618 processes the combined set of sample future solutions through aggregation. The aggregation process comprises performing a mathematical or statistical algorithm on the combined set of sample future solutions to produce meaningful information for the purpose of decision making. This is basically a summary value for each action available from the initial state (generated by step 702). In the present exemplary embodiment, the aggregation process comprises performing a weighted summation or averaging of all the solutions in the set to produce an index value. The index value can then be used to determine the relative importance of the combined set of sample solutions compared to a combined set of sample solutions associated with a different action. After step 712 is performed, control is passed to step 714.

At step 714, the quasi-Monte Carlo simulation module 612 has aggregated a set of solutions for each action relative to the initial state 604. The simulation module 712 then chooses the best action for the initial state 604 based at least partially on the aggregation performed in step 712. In the exemplary embodiment, the best action is determined by comparing the index values created in step 712.

At step 716, the selected best action determined in step 714 is output by the output device 622 to either memory 608 or an external device such as a storage system 626, or a monitor.

The method ends at step 718.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for artificial intelligence (AI) planning based quasi-Monte Carlo simulation for probabilistic planning, comprising:

using a computer processor, storing into a computer memory an initial state of a system and a description of a target domain;

generating a set of possible actions for the initial state;

for each action in the set of the possible actions, performing a sequence of actions, comprising:
- generating by an AI planner a set of sample future outcomes for the initial state;
- generating by a quasi-Monte Carlo simulation module probabilities of solutions for each of the sample future outcomes;
- evaluating future outcome solutions that are either highest probability, or lowest probability and highest-impact, relative to the solutions generated by the AI planner, wherein the AI planner searches a probabilistic planning tree for harmful sequences of actions which are either highest probability, or lowest probability and highest-impact, relative to the solutions generated by the AI planner for focused evaluation thereof;
- aggregating the evaluated solutions with future outcome solutions generated by the quasi-Monte Carlo simulation module, each of the aggregated solutions indicating a state of the system after a corresponding outcome occurs; and
- analyzing the aggregated set of future outcome solutions;

automatically selecting a best action based at least partially on the analysis of the aggregated set of future outcome solutions; and outputting the selected best action to computer memory for probabilistic planning.

2. The method of claim 1, where the set of possible actions for the initial state contains all of the possible actions for the initial state.

3. The method of claim 1, wherein the description of a target domain comprises:
- a description of a desired goal state,
- known probabilities of future events, and
- a set of possible actions for the initial state.

4. The method of claim 1, wherein the generating a set of sample future outcomes is performed by a uniform sampling algorithm that includes a Monte Carlo sampling method.

5. The method of claim 4, wherein the uniform sampling algorithm comprises generating a sequence of fixed length random numbers.

6. The method of claim 1, wherein the AI planner is an automated planning engine that takes general problem description language that includes planning domain definition language (PDDL) as its input.

7. The method of claim 1, wherein:
- the action of analyzing the aggregated set of future outcome solutions creates an index based at least partially on the analysis of the aggregated set of future outcome solutions; and
- the action of selecting a best action is based at least partially on the created index.

8. The method of claim 7, wherein the index is created through a weighted averaging of the future outcomes in the aggregated set of future outcome solutions.

9. The method of claim 7, further comprising comparing an aggregated set of future outcome solutions for a given action with the aggregated set of future outcome solutions for a different action.

10. The method of claim 1, wherein the selected best action is output to at least one of the following:
- a computer monitor, and
- a file system.

11. A non-transitory computer readable medium encoding instructions which, when executed by a computer, performs the method of claim 1.

12. The method of claim 1, wherein the aggregated set of future outcome solutions is relative to the initial state.

13. The method of claim 1, wherein the probabilistic planning tree includes a plurality of states of the system and a plurality of actions, the plurality of states including the initial state and the aggregated solutions, and the plurality of actions including the set of possible actions and probabilistic outcomes of the set of possible actions represented as actions, and wherein the plurality of actions connect pairs of the plurality of states.

14. A computer-based system for artificial intelligence (AI) planning based quasi-Monte Carlo simulation for probabilistic planning, comprising:
- an AI planner; and
- a quasi-Monte Carlo simulation module adapted to:
  - store an initial state of a system and a description of a target domain into a computer memory;
  - generate a set of possible actions for the initial state for a desired initial state;
  - for each action in the set of the possible actions, perform a sequence of actions, comprising:
    - generating by the AI planner a set of sample future outcomes for the initial state;
    - generating probabilities of solutions for each of the sample future outcomes;
    - evaluating a set of future outcome solutions that are either highest probability, or lowest probability and highest-impact, relative to the solutions generated by the AI planner, wherein the AI planner searches a probabilistic planning tree for harmful sequences of actions which are either highest probability, or lowest probability and highest-impact, relative to the solutions generated by the AI planner for focused evaluation thereof;
    - combining the evaluated solutions with future outcome solutions generated by the quasi-Monte Carlo simulation module into an aggregated set of future outcome solutions, each of the aggregated solutions indicating a state of the system after a corresponding outcome occurs; and
    - analyzing the aggregated set of future outcome solutions;
  - automatically selecting a best action based at least partially on the analysis of the aggregated set of future outcome solutions; and
  - outputting the selected best action to computer memory for probabilistic planning.

15. The system of claim 14, wherein the set of possible actions for the initial state contains all of the possible actions for the initial state.

16. The system of claim 14, wherein the description of a target domain comprises:
- a description of a desired goal state,
- known probabilities of future events, and
- a set of possible actions for the initial state.

17. The system of claim 14, wherein the generating a set of sample future outcomes is performed by a sampling algorithm compatible with a Monte Carlo sampling method;
wherein the sampling algorithm is one of:
- a uniform sampling algorithm,
- stratified sampling algorithm, and
- a residual sampling algorithm.

18. The system of claim 14, wherein the AI planner is an automated planning engine that takes general problem description language including planning domain definition language (PDDL) as its input.

19. The system of claim 14, wherein:
the action of analyzing the aggregated set of future outcome solutions creates an index based at least partially on the analysis of the aggregated set of future outcome solutions; and
the action of selecting a best action is based at least partially on the created index.

20. The system of claim 19, wherein the index is created through a weighted averaging of the future outcomes in the aggregated set of future outcome solutions.

21. The system of claim 14, wherein the selected best action is output to at least one of the following:
a computer monitor, and
a file system.

22. The system of claim 14, wherein the computer memory additionally receives as input at least one of the following:
a threshold value to identify a low probability solution; and
a threshold value to identify a high-impact solution.

23. The system of claim 14, wherein the probabilistic planning tree includes a plurality of states of the system and a plurality of actions, the plurality of states including the initial state and the aggregated solutions, and the plurality of actions including the set of possible actions and probabilistic outcomes of the set of possible actions represented as actions, and wherein the plurality of actions connect pairs of the plurality of states.

* * * * *